(12) United States Patent
Demura et al.

(10) Patent No.: US 9,517,568 B2
(45) Date of Patent: Dec. 13, 2016

(54) MULTI-AXIS ROBOT

(71) Applicant: KAWASAKI JUKOGYO KABUSHIKI KAISHA, Kobe-shi, Hyogo (JP)

(72) Inventors: Nobuhiro Demura, Kakogawa (JP); Ryo Taniuchi, Nishinomiya (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 320 days.

(21) Appl. No.: 14/354,787

(22) PCT Filed: Oct. 5, 2012

(86) PCT No.: PCT/JP2012/006431
§ 371 (c)(1),
(2) Date: Apr. 28, 2014

(87) PCT Pub. No.: WO2013/061522
PCT Pub. Date: May 2, 2013

(65) Prior Publication Data
US 2014/0290416 A1    Oct. 2, 2014

(30) Foreign Application Priority Data
Oct. 28, 2011 (JP) ................... 2011-237379

(51) Int. Cl.
*B25J 19/00* (2006.01)
*B25J 11/00* (2006.01)
*F16L 3/015* (2006.01)

(52) U.S. Cl.
CPC .............. *B25J 19/0029* (2013.01); *B25J 19/00* (2013.01); *B25J 19/0025* (2013.01);
(Continued)

(58) Field of Classification Search
CPC . B25J 11/0075; B25J 19/0025; B25J 19/0029; B25J 19/0041; B25J 19/0075; B25J 19/0079; Y10T 74/20311; Y10T 74/20329; Y10T 403/39; Y10T 403/32106
See application file for complete search history.

(56) References Cited

U.S. PATENT DOCUMENTS

| 4,864,888 A * | 9/1989 | Iwata .................... B25J 17/0241 403/161 |
| 7,299,713 B2 * | 11/2007 | Uematsu ............... B25J 19/0029 248/51 |

(Continued)

FOREIGN PATENT DOCUMENTS

| DE | 3601437 A1 * | 7/1986 | ......... B05B 13/0431 |
| JP | U-60-153792 | 10/1985 | |

(Continued)

OTHER PUBLICATIONS

International Search Report issued in International Application No. PCT/JP2012/006431 mailed Dec. 18, 2012.

*Primary Examiner* — William Kelleher
*Assistant Examiner* — Joseph Brown
(74) *Attorney, Agent, or Firm* — Oliff PLC (57) ABSTRACT

A multi-axis robot includes: a base with a hollow; a support member with a hollow, the support member constituting a proximal end portion of an arm of the multi-axis robot; and a guide pipe configured to rotate together with the support member, the guide pipe being configured such that one end of the guide pipe is rotatably inserted in the base, and inner space of the guide pipe is in communication with inner space of the support member and inner space of the base. A notch is formed in a peripheral surface of an end portion of the guide pipe, the end portion being positioned in the base. A motor cable extends to reach the notch from radially outside of the guide pipe.

8 Claims, 8 Drawing Sheets

(52) U.S. Cl.
CPC ....... *B25J 19/0075* (2013.01); *B25J 19/0079* (2013.01); *B25J 11/0075* (2013.01); *F16L 3/015* (2013.01); *Y10T 74/20311* (2015.01)

(56) References Cited

U.S. PATENT DOCUMENTS

| | | | | |
|---|---|---|---|---|
| 7,622,001 | B2* | 11/2009 | Inada | B25J 19/0029 |
| | | | | 118/300 |
| 8,667,926 | B2* | 3/2014 | Takahashi | B05B 15/1277 |
| | | | | 118/321 |
| 8,893,577 | B2* | 11/2014 | Ibayashi | B25J 19/0025 |
| | | | | 74/490.02 |
| 2005/0189333 | A1 | 9/2005 | Nakagiri et al. | |

FOREIGN PATENT DOCUMENTS

| | | | | |
|---|---|---|---|---|
| JP | A-2-109692 | 4/1990 | | |
| JP | U-2-97592 | 8/1990 | | |
| JP | U-6-80586 | 11/1994 | | |
| JP | A-2006-95614 | 4/2006 | | |
| JP | A-2009-178828 | 8/2009 | | |
| JP | A-2010-149214 | 7/2010 | | |
| JP | A-2010-247242 | 11/2010 | | |
| KR | 10-1998-0052675 A | 4/2000 | | |
| KR | 10-2006-0042162 A | 5/2006 | | |
| WO | WO 2009036785 A1 * | 3/2009 | ........... | B23D 45/027 |

\* cited by examiner

MULTI-AXIS ROBOT

TECHNICAL FIELD

The present invention relates to multi-axis robots for industrial use, and particularly to multi-axis robots for use in painting workpieces.

BACKGROUND ART

One of the multi-axis robots for use in painting workpieces is disclosed in Patent Literature 1. The multi-axis robot disclosed in Patent Literature 1 includes: a base; a turning unit provided on the base such that the turning unit is turnable around the central axis of the base; an arm attached to the turning unit such that the arm is rotatable in a plane perpendicular to the turning unit; and a painting gun rotatably attached to the distal end of the arm. The turning unit, the arm, and the painting gun are caused to turn or rotate by respective dedicated motors. A flexible long body extends from the base. The flexible long body extending from the base passes through the turning unit and the arm, and is connected to the painting gun. The flexible long body includes a cable through which power is fed to each motor, and includes a tube through which paint is fed to the painting gun. The flexible long body is inserted in the base in such a manner that the flexible long body extends along the central axis of the base.

CITATION LIST

Patent Literature

PTL 1: Japanese Laid-Open Patent Application Publication No. 2006-95614

SUMMARY OF INVENTION

Technical Problem

In such a conventional multi-axis robot, the flexible long body extends along the central axis of the base, and the turning unit turns around the central axis of the base. Therefore, stretching of the flexible long body due to the turning of the turning unit need not be taken into consideration. However, various manners of use of the multi-axis robot are conceivable when the multi-axis robot is used for painting work. In one example manner of use of the multi-axis robot, the flexible long body is inserted in the base substantially perpendicularly to the central axis of the base. In such a case, it is necessary for the multi-axis robot to include a configuration intended to deal with the stretching of the flexible long body due to the turning of the turning unit provided on the base. Moreover, considering the efficiency in the painting work, it is necessary to realize the configuration intended to deal with the stretching of the flexible long body as a compact configuration so that the painting booth can be made compact. The same technical problem arises also in other multi-axis robots that include a linear body different from the above-described flexible long body.

The present invention has been made to solve the above-described problem. An object of the present invention is to provide a multi-axis robot including a configuration intended to deal with stretching of a linear body due to rotation of a rotating unit provided on a base, the configuration being realized as a compact configuration.

Solution to Problem

A multi-axis robot according to the present invention includes: a base with a hollow; a support member with a hollow, the support member constituting a proximal end portion of an arm of the multi-axis robot, the support member being provided such that the support member is rotatable around a central axis of the base; and a guide pipe provided in the support member and configured to rotate together with the support member, the guide pipe being configured such that: one end of the guide pipe is rotatably inserted in the base; inner space of the guide pipe is in communication with inner space of the support member and inner space of the base; and a first linear body is inserted in the guide pipe in a longitudinal direction of the guide pipe. A rotational center of the guide pipe deviates from a center of the first linear body. A notch, through which the first linear body is passed, is formed in a peripheral surface of an end portion of the guide pipe, the end portion being positioned in the base. The first linear body extends to reach the notch from radially outside of the guide pipe, such that a bending portion is formed around an outer peripheral surface of the guide pipe in a plane parallel to a rotation direction of the guide pipe, and extends from the notch to reach the inner space of the support member by passing inside the guide pipe.

According to the present invention, the first linear body extends in the plane parallel to the rotation direction of the guide pipe in such a manner as to form the bending portion around the outer peripheral surface of the guide pipe, and then passes through the notch of the guide pipe. That is, the first linear body is bent in a plane substantially perpendicular to the direction of a rotational axis of the support member. In this manner, the length of the bending portion in the direction of the rotational axis of the support member can be made short.

Since the bending portion reaches the notch, the bending portion is provided between both ends of the guide pipe. Accordingly, the length of the base in the direction of the rotational axis of the support member can also be made short.

Moreover, by reducing the diameter of the guide pipe in accordance with the diameter of the first linear body, the amount of bending of the bending portion can be reduced. In this manner, the overall length of the first linear body can be reduced.

When the guide pipe rotates, the first linear body is twisted in the guide pipe, and meanwhile, since the rotational center of the guide pipe deviates from the center of the first linear body, the bending portion of the first linear body is deformed. That is, by means of both twisting of the first linear body in the guide pipe and deformation of the bending portion of the first linear body around the guide pipe, damage to the first linear body due to rotation of the support member, specifically, twisting and stretching of the first linear body, can be absorbed effectively.

In the above-described invention, a guide member with a guide hole in which the first linear body is inserted in a direction perpendicular to the central axis, the guide member being swingable around the guide pipe, is provided at the notch of the guide pipe, and the first linear body is guided from radially outside of the guide pipe into the guide pipe through the guide hole and the notch.

According to the above configuration, in a state where the first linear body is inserted in the guide hole, the guide member can swing in the same plane as a plane in which the bending portion is positioned. Accordingly, the guide member swings in accordance with stretching and contraction of the first linear body, and thereby motion of the first linear body can be stabilized. By thus stabilizing the motion of the first linear body, the first linear body can be prevented from being unintendedly rubbed against the inside of the base, and thereby the life of the first linear body can be extended. Moreover, in a case where the first linear body is formed as a bundle of multiple linear bodies, the linear bodies can be prevented from becoming unbundled.

In the above-described invention, the guide pipe is divided by a partition wall into a first passage and a second passage, each of which extends in an axial direction of the guide pipe. One end of the first passage is closed, the first passage being configured such that, at the one end, the first passage is in communication with the inner space of the base via the notch, and at another end of the first passage, the first passage is in communication with the inner space of the support member. Both ends of the second passage are in communication with external space connected to an opening of the support member and external space connected to an opening of the base. The first linear body is a linear body for energization, and is inserted in the first passage. The second linear body extends from the opening of the base to outside of the support member by passing through the second passage.

According to the above configuration, since the first linear body and the second linear body arranged parallel to each other can be passed through the inside of the guide pipe, the first linear body and the second linear body are prevented from being separated from each other, and can be stored in a compact manner.

In the above-described invention, the inner space of the base, inner space of a first passage of the guide pipe, and the inner space of the support member form a sealed air-tight chamber.

According to the above configuration, external air of the base and the support member does not enter the inner space of the base and the support member. This makes it possible to eliminate a risk that is caused when the first linear body, which is a linear body for energization, comes into contact with flammable gas outside the base and the support member.

Advantageous Effects of Invention

According to the multi-axis robot of the present invention, the length of the bending portion of the first linear body in the direction of the rotational axis of the support member can be made short, and a booth in which the multi-axis robot is disposed can be made compact.

Accordingly, a configuration intended to deal with stretching of the first linear body due to the rotation of the support member connected to the base can be realized as a compact configuration.

Moreover, twisting and stretching of the first linear body due to the rotation of the support member can be assuredly absorbed by means of both twisting of the first linear body in the guide pipe and deformation of the bending portion of the first linear body around the guide pipe. Furthermore, the range of rotation of the support member can be increased.

DESCRIPTION OF EMBODIMENTS

Hereinafter, one embodiment of the present invention is described with reference to the drawings. In the drawings, the same or corresponding elements are denoted by the same reference signs, and repeating the same descriptions is avoided below.

Figure 1:
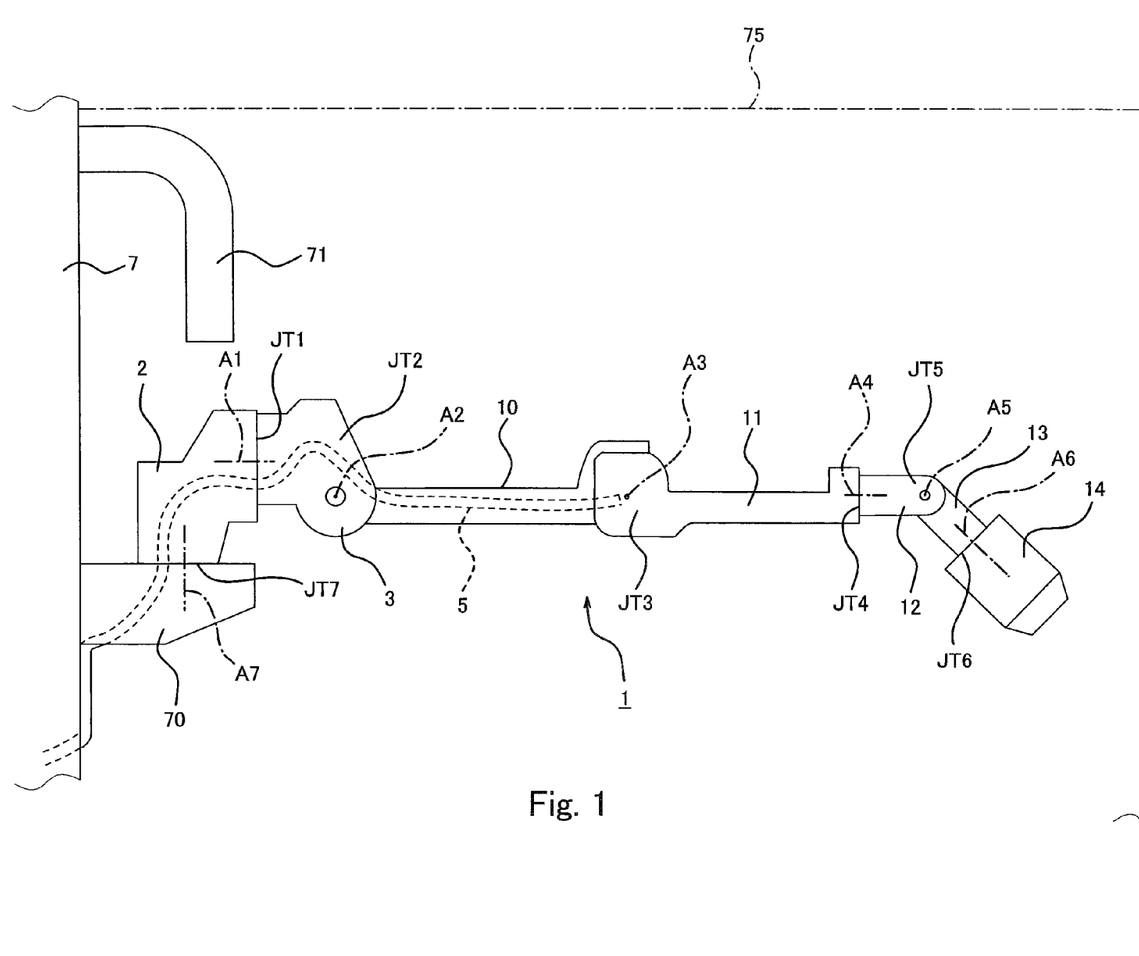
FIG. 1 is a side view showing the configuration of a multi-axis robot and wiring of a motor cable according to one embodiment of the present invention.

As shown in FIG. 1, a multi-axis robot 1 according to the embodiment of the present invention is, for example, an industrial robot for use in painting a workpiece. However, the multi-axis robot 1 is not limited to a particular type of robot, so long as the multi-axis robot 1 includes a linear body.

The multi-axis robot 1 includes a base 2. The base 2 is, for example, provided on a turn table 70 provided perpendicularly to a wall 7. A support member 3, a first link 10, a second link 11, a first hand 12, a second hand 13, and a painting gun 14, which is an attachment, are connected to the base 2, such that these elements 3, 10, 11, 12, 13, and 14 are sequentially connected to one another in this order, and among these elements, the support member 3 is most closely connected to the base 2. In the description below, the direction from the wall 7 toward the painting gun 14 is referred to as forward, and the opposite direction is referred to as rearward.

The eight elements from the turn table 70 to the painting gun 14 constitute an arm of the multi-axis robot 1, and are rotatably connected to one another. That is, the support member 3 is rotatable around a rotational axis A1 of a first joint JT1. The first joint JT1 connects between the support member 3 and the base 2. The first link 10 is rotatable around a rotational axis A2 of a second joint JT2. The second joint JT2 connects between the link 10 and the support member 3. The second link 11 is rotatable around a rotational axis A3 of a third joint JT3. The third joint JT3 connects between the second link 11 and the first link 10. The first hand 12 is rotatable around a rotational axis A4 of a fourth joint JT4. The fourth joint JT4 connects between the first hand 12 and the second link 11. The second hand 13 is rotatable around a rotational axis A5 of a fifth joint JT5. The fifth joint JT5 connects between the second hand 13 and the first hand 12. The painting gun 14 is rotatable around a rotational axis A6 of a sixth joint JT6. The sixth joint JT6 connects between the painting gun 14 and the second hand 13. The base 2 is rotatable around a rotational axis A7 of a seventh joint JT7. The seventh joint JT7 connects between the base 2 and the turn table 70. The base 2 and the support member 3 constitute a proximal end portion of the arm of the multi-axis robot 1.

The joints JT1 to JT7 are provided with respective servomotors (not shown), which are rotatable independently of one another. When the servomotors operate, these elements corresponding to the servomotors are allowed to rotate around the rotational axes A1 to A7, respectively. As a result of the servomotors allowing the corresponding elements to rotate around the rotational axes A1 to A7 independently of one another, the painting gun 14 can be moved to a desired position along a desired moving path in a desired orientation.

As described below, a motor cable 5 for energizing each servomotor of the multi-axis robot 1, and a tube 6 for supplying paint, are connected to the multi-axis robot 1 by wiring. The motor cable 5 and the tube 6 are both formed of a flexible material, and thereby the motor cable 5 and the tube 6 are allowed to be twisted to a small degree.

The motor cable 5 is one example of a first linear body of the present invention. The tube 6 is one example of a second linear body of the present invention. However, the first and second linear bodies are not limited to the motor cable 5 and the tube 6.

The paint sprayed from the painting gun 14 is flammable and volatile. In order to prevent volatile components from spreading, the entire multi-axis robot 1 is accommodated in a painting booth 75.

FIG. 1 shows the wiring of the motor cable 5. The motor cable 5 is formed, for example, by covering a bundle of electrical wires with a flexible resin sheet. The motor cable 5 extends from the wall 7 and enters the turn table 70 from the lower side of the turn table 70. One of the electrical wires is connected to the servomotor of the seventh joint JT7 in the turn table 70.

The motor cable 5 is inserted in the base 2, and an electrical wire corresponding to the base 2 is connected to the servomotor of the first joint JT1. Further, in the support member 3, an electrical wire corresponding to the support member 3 is connected to the servomotor of the second joint JT2. Thereafter, the motor cable 5 is passed through the inside of the first link 10, the second link 11, the first hand 12, and the second hand 13, and electrical wires corresponding thereto are connected to the servomotors of the respective joints JT3 to JT6.

A passage through which the motor cable 5 is inserted and passed is formed from the turn table 70 to the second hand 13. The interior of the passage is a sealed air-tight chamber. The pressure in the interior of the passage is maintained to be higher than the pressure of the outside of the multi-axis robot 1. In order to maintain such a high pressure in the passage, for example, a pump (not shown) configured to supply air or inert gas to the passage is provided at a predetermined position between the turn table 70 and the second hand 13. As previously described, an atmosphere containing flammable and volatile components is contained in the painting booth 75. Therefore, the high pressure in the passage is maintained in order to prevent the air of the atmosphere from entering the inside of the multi-axis robot 1 and contacting the motor cable 5. That is, if the air containing flammable and volatile components comes into contact with the motor cable 5 while the motor cable 5 is being energized, there is a risk of catching fire. Such a risk is eliminated by maintaining the high pressure in the passage.

Figure 2:
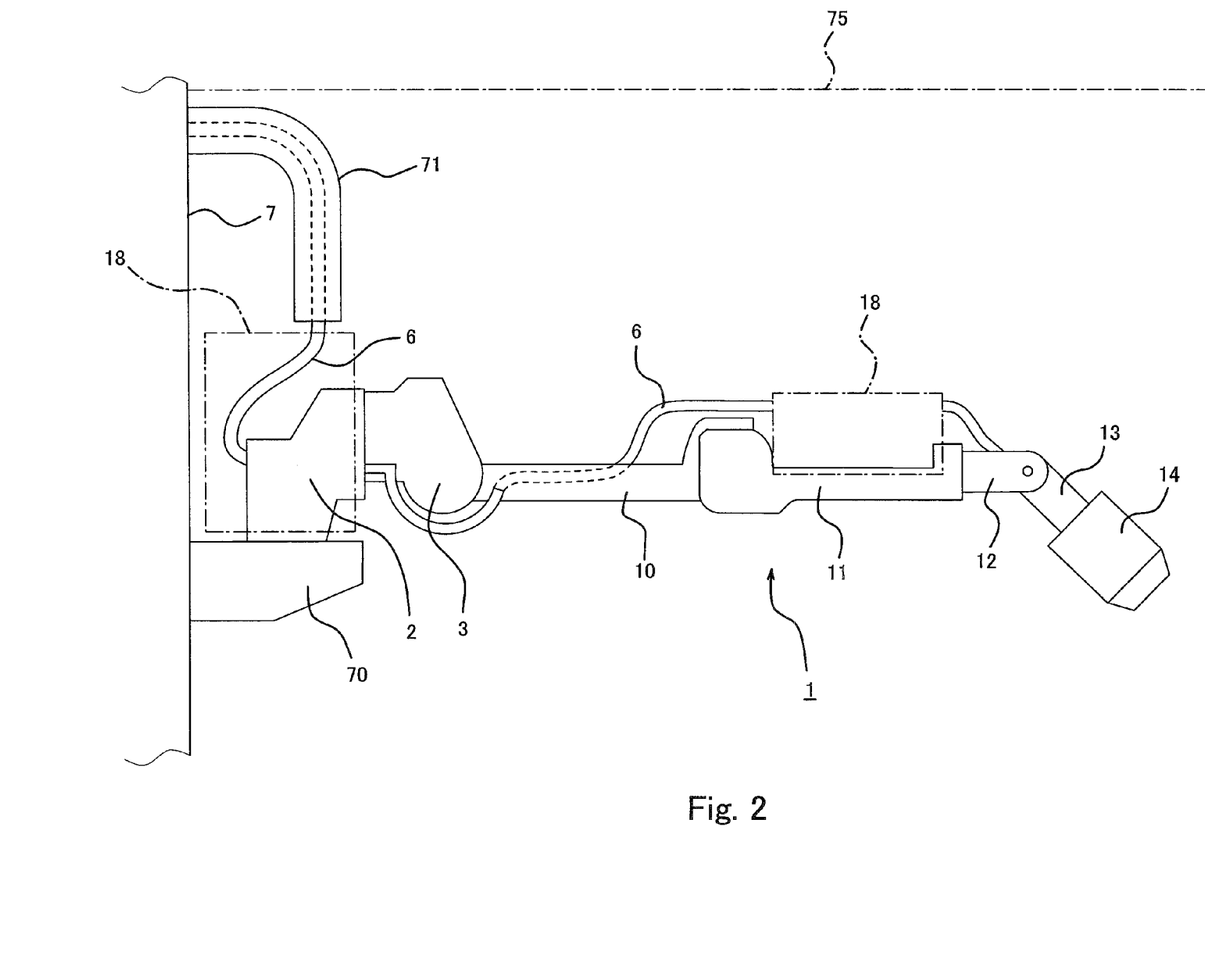
FIG. 2 is a side view showing the configuration of the multi-axis robot and wiring of a tube according to the embodiment of the present invention.

FIG. 2 shows the wiring of the tube 6 through which the paint is supplied to the painting gun 14 of the multi-axis robot 1. The tube 6 is formed by covering a bundle of a large number of flexible narrow tubes (not shown) with, for example, a flexible sheet. Different colors of volatile paint flow through the respective narrow tubes. A substantially L-shaped protective cover 71, through which the tube 6 is passed, is provided on the wall 7 above the multi-axis robot 1. The lower end of the protective cover 71 is positioned more forward than the rear end of the base 2. The tube 6, which passes through the wall 7 and protrudes out of the lower end of the protective cover 71, extends downward while keeping a distance from the wall 7, and is then inserted into the base 2 from the rear end of the base 2 such that the tube 6 is inserted forward.

Accordingly, the tube 6 is bent while extending from the lower end of the protective cover 71 to the rear end of the base 2. By bending the tube 6 in such a manner, the tube 6 is prevented from being tensioned when the eight elements from the turn table 70 to the painting gun 14 rotate.

The base 2 rotates in a horizontal plane around the seventh joint JT7 connecting between the base 2 and the turn table 70. Since the tube 6 is formed of a flexible material, the flexibility thereof absorbs a small degree of twisting of the tube 6.

Since the flammable and volatile paint flows through the inside of the tube 6, it is not preferable if the motor cable 5, through which a current flows, and the tube 6 extend side by side for a long distance. Such a non-preferable arrangement is eliminated if the tube 6 is disposed outside the multi-axis robot 1. However, in a case where the tube 6 is disposed outside the multi-axis robot 1, if the tube 6 moves freely in accordance with rotations of the respective elements from the base 2 to the painting gun 14, there are risks, for example, as follows: the tube 6 comes into contact with a workpiece to be painted; or the tube 6 comes into contact with the wall 7. If the tube 6 comes into contact with the workpiece, then the paint previously applied onto the workpiece adheres to the tube 6, causing a problem in coating quality. If the tube 6 comes into contact with the wall 7, then dust or the like on the wall 7 comes off the wall 7 due to the contact of the tube 6 against the wall 7, and floats in the painting booth 75. The dust or the like thus floating in the painting booth 75 sticks to the workpiece. This may also cause a problem in coating quality. If a component dedicated for suppressing the motion of the tube 6 is provided on the multi-axis robot 1, then the configuration of the multi-axis robot 1 becomes complex.

Therefore, with the protective cover 71, the tube 6 is prevented from coming into contact with the wall 7, and also, as described below, unintended motion of the tube 6 is restricted with a simple structure between the base 2 and the support member 3.

As shown in FIG. 2, a painting device 18 configured to apply pressure to spray out the paint is selectively disposed on the base 2 or on the second link 11 as indicated by dashed-dotted lines in FIG. 2. The painting device 18 includes therein a color change valve (CCV), for example. The color change valve is configured to switch opening and closing of each narrow tube in the tube 6 in accordance with a color to be used for painting. A workpiece to be painted by the painting gun 14 is, for example, an automobile door. The painting device 18 disposed on the base 2 is mainly used for painting the inside of the door, and the painting device 18 disposed on the second link 11 is mainly used for painting the outside of the door. This will be described below.

Figure 3:
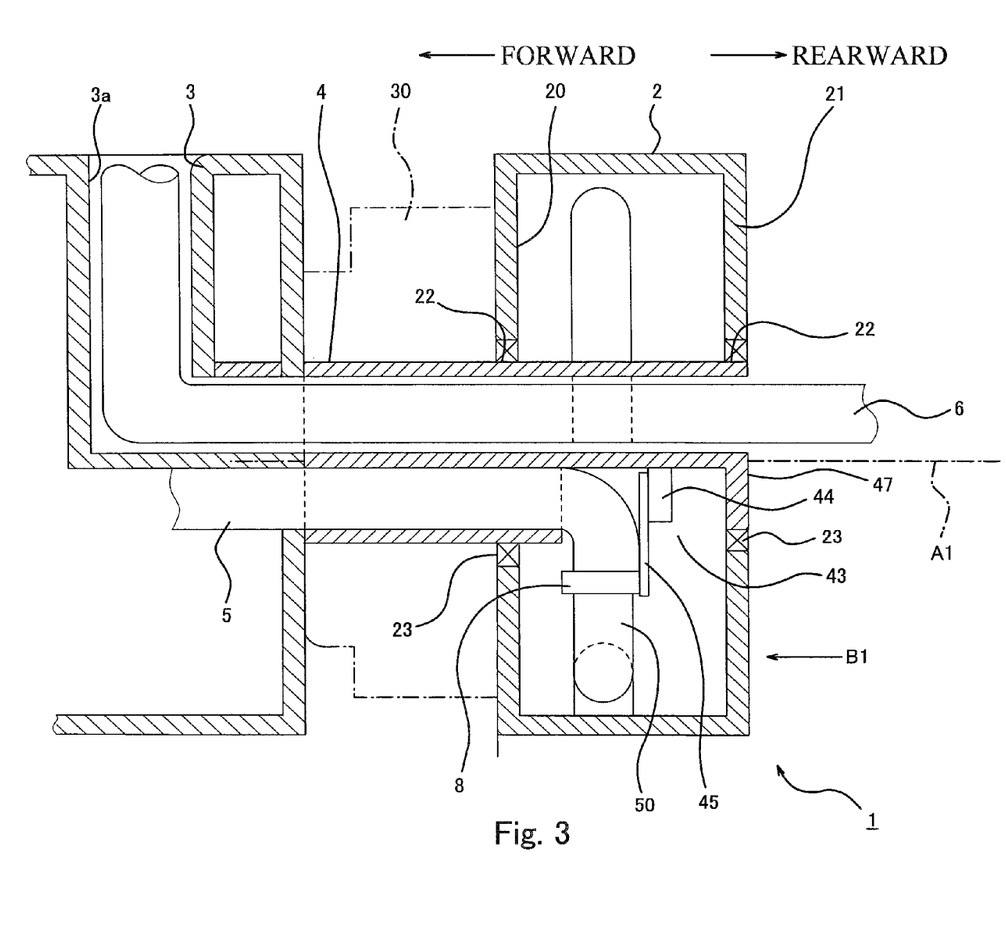
FIG. 3 is a sectional plan view showing the configurations of a base and a support member of FIG. 1 around a rotational axis.

FIG. 3 is a sectional plan view showing the configurations of the base 2 and the support member 3 of FIG. 1 around the rotational axis A1. FIG. 3 shows the base 2 and the support member 3, such that their positions are left-right reversed compared to FIG. 1. The base 2 and the support member 3 are both hollow inside. A rotating unit 30, which is caused by the aforementioned servomotor to rotate, is provided between the base 2 and the support member 3 as indicated by dashed-dotted lines in FIG. 3. The support member 3 is attached to the rotating unit 30, and rotates together with the rotating unit 30. An internal passage of the base 2 and an internal passage of the support member 3 are in communication with each other via a guide pipe 4 passing through the rotating unit 30. One end of the guide pipe 4 is attached to the support member 3. The longitudinal direction of the guide pipe 4 is parallel to the rotational axis A1, and the guide pipe 4 rotates coaxially with the rotational axis A1. It should be noted that it is not necessary for the guide pipe 4 to be coaxial with the support member 3.

The base 2 includes a front wall 20 and a rear wall 21. The front wall 20 faces the support member 3, and the rear wall 21 faces the front wall 20. Openings 22 are formed in the front and rear walls 20 and 21, respectively. The other end of the guide pipe 4 passes through the openings 22. The inner periphery of each opening 22 is provided with a bearing 23, or an oil seal, which receives the guide pipe 4. The bearing 23 or the oil seal supports the guide pipe 4 in such a manner as to allow the guide pipe 4 to rotate smoothly, and maintains the pressure in the inner space of the base 2 and the support member 3 to be high. The motor cable 5 is inserted in the guide pipe 4 in the longitudinal direction of the guide pipe 4. The other end of the guide pipe 4 is positioned inside the internal passage of the base 2. A notch 43, through which the motor cable 5 is passed, is formed at the other end of the guide pipe 4.

Figure 4:
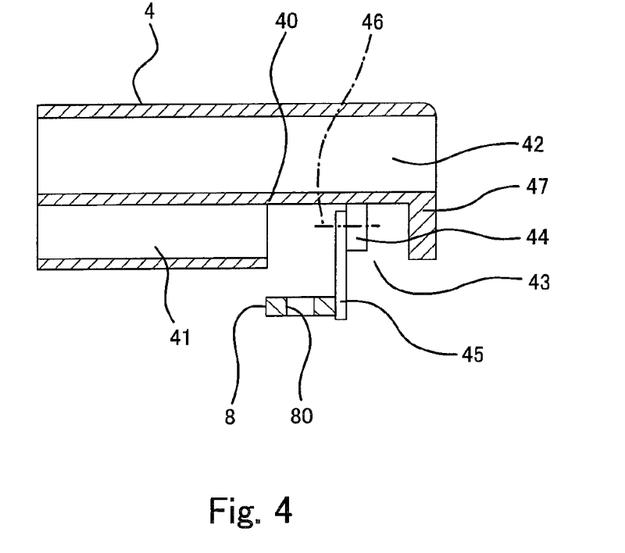
FIG. 4 is a sectional front view of a guide pipe.

FIG. 4 is a sectional front view of the guide pipe 4. The inner space of the guide pipe 4 is divided by a partition wall 40, which is disposed in the inner space, into two passages arranged one above the other and extending in the axial direction, i.e., a first passage 41 and a second passage 42. In other words, the guide pipe 4 is a multi-passage pipe including two passages extending in the axial direction.

The rear end face of the first passage 41 is closed by a back plate 47. The front end face of the first passage 41 is open and in communication with the inner space of the support member 3. The rear end face of the second passage 42 is open and in communication with external space behind the base 2. The front end face of the second passage 42 is open and in communication with external space via an opening 3a (see FIG. 3) formed in an outer peripheral surface of the support member 3. That is, the first passage 41 forms a part of an air-tight passage in which the motor cable 5 is inserted, and thus the pressure in the first passage 41 is maintained to be high. The second passage 42 is open to the external space of the multi-axis robot 1.

The motor cable 5 guided through the notch 43 is inserted in the first passage 41, and the tube 6 is inserted in the second passage 42. The motor cable 5 and the tube 6 are isolated from each other by the partition wall 40, and thus prevented from coming into contact with each other. In this manner, a risk of, for example, the tube 6 catching fire is prevented. The single guide pipe 4 serves to suppress the motion of both of the motor cable 5 and the tube 6, and thus the structure for suppressing the motion of the motor cable 5 and the tube 6 is simplified. Moreover, as shown in FIG. 4, the center of the motor cable 5 deviates from the rotational center of the guide pipe 4 in the radial direction of the guide pipe 4. Therefore, the motor cable 5 is twisted when the guide pipe 4 rotates.

The notch 43 is formed in a peripheral surface of the guide pipe 4 at the first passage 41 side. Inside the notch 43, a protrusion 44 protrudes from the partition wall 40 perpendicularly to the longitudinal direction of the guide pipe 4. A support bar 45 is provided on the protrusion 44, in such a manner that the support bar 45 is rotatable around an axis 46. The support bar 45 is freely rotatable by means of, for example, a bearing (not shown) in the protrusion 44. An annular guide member 8 with a guide hole 80 formed at its center is attached to the distal end of the support bar 45. The motor cable 5 is inserted and fitted in the guide hole 80. That is, the guide member 8 is freely rotatable independently of the guide pipe 4.

The guide member 8 is formed of, for example, a material having a small friction against the motor cable 5. Accordingly, the motor cable 5 is allowed to slide inside the guide member 8 smoothly. Since the support bar 45 rotates in a plane including the rotation direction of the guide pipe 4, the guide member 8 also rotates in the same plane.

Figure 5:
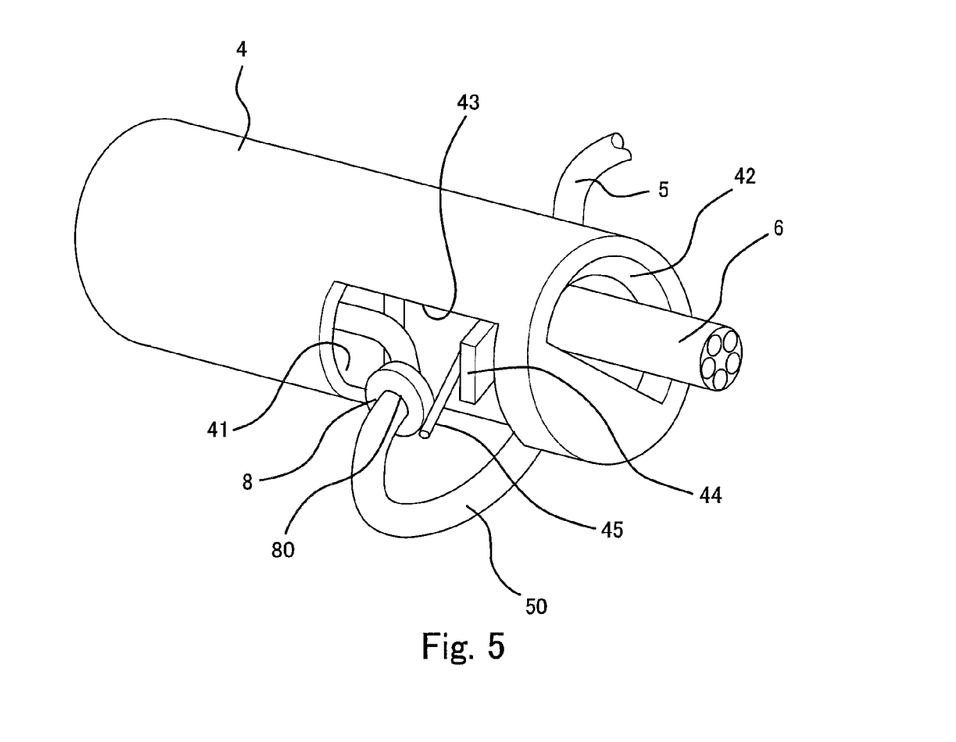
FIG. 5 is a perspective view of the guide pipe, showing a state where the motor cable and the tube are inserted in the guide pipe.

FIG. 5 is a perspective view of the guide pipe 4, showing a state where the motor cable 5 and the tube 6 are inserted in the guide pipe 4. In the base 2, the motor cable 5 extends from the outside of the guide pipe 4 in a plane including the rotation direction of the guide pipe 4, so as to form a bending portion 50 in a substantially arc shape around the outer peripheral surface of the guide pipe 4, and then reaches the notch 43. In the notch 43, the motor cable 5 is guided by the guide hole 80 of the guide member 8; then the orientation of the motor cable 5 is changed so as to extend in a direction substantially perpendicular to the bending portion 50; subsequently, the motor cable 5 passes through the inside of the first passage 41 of the guide pipe 4; and thereafter the motor cable 5 exits an end-face opening of the support member 3 to reach the inner space of the support member 3. Thus, the motor cable 5 extends from the inner space of the base 2, passing through the guide pipe 4, to reach the inner space of the support member 3. Since the pressure in the inner space of the base 2 and the pressure in the inner space of the support member 3 are both higher than the pressure of the outside of the multi-axis robot 1, the external air of the multi-axis robot 1 does not come into contact with the motor cable 5. As described below, in accordance with the rotation of the guide pipe 4, the motor cable 5 in the guide pipe 4 is twisted, and the bending portion 50 of the motor cable 5 around the guide pipe 4 is deformed. In this manner, twisting and stretching of the motor cable 5 due to the rotation of the support member 3 are absorbed.

Meanwhile, the tube 6 is inserted in the second passage 42 from an end-face opening of the guide pipe 4, exists an end-face (front end face) opening of the guide pipe 4 at the support member 3 side, and passes through the opening 3a formed in the outer peripheral surface of the support member 3 to reach the external space.

(Actual Motion of Cable)

Figure 6A:
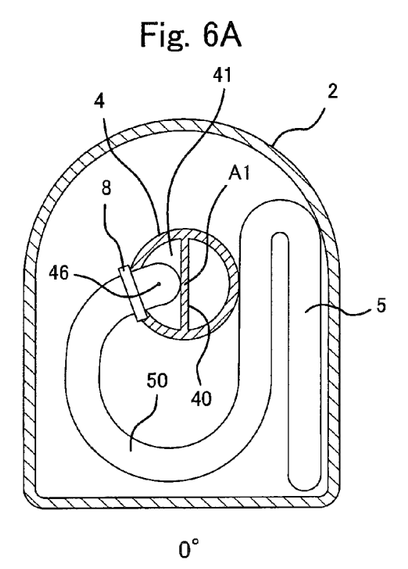
FIG. 6A to FIG. 6D show how the motor cable moves in accordance with rotation of the support member around the rotational axis.

FIGS. 6A to 6D show how the motor cable 5 moves in accordance with the rotation of the support member 3 around the rotational axis A1. Each of FIGS. 6A to 6D shows a view of FIG. 3 as viewed in a direction B1. For the sake of convenience of the description, the tube 6 is not shown in FIGS. 6A to 6D. FIG. 6A shows a reference state of the support member 3 and the guide pipe 4. In the reference state, the rotation angle is assumed to be 0°. In the present embodiment, while the multi-axis robot 1 is in use, the support member 3 and the guide pipe 4 rotate from the reference state in an angular range of, for example, ±120°. However, the angular range is not limited to ±120°. The length of the bending portion 50 is set to have such a margin that even when the motor cable 5 is stretched due to the rotation of the support member 3 and the guide pipe 4, the bending portion 50 will not be tensioned.

Figure 6B:
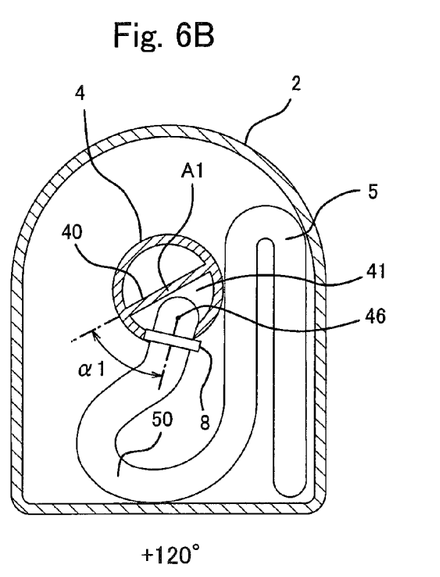

FIG. 6B shows a state where the support member 3 and the guide pipe 4 have rotated by +120°, i.e., counterclockwise, from the reference state of FIG. 6A. In accordance with the rotation of the guide pipe 4, the guide member 8 rotates around the rotational axis A1, thereby guiding the motor cable 5. Accordingly, the bending portion 50 of the motor cable 5 bends such that a swelled portion is deformed into an inward bending portion. In addition, as previously described, the motor cable 5 in the guide pipe 4 is twisted in accordance with the rotation of the guide pipe 4.

Since the guide member 8 can rotate around the axis 46 (see FIG. 4) independently of the guide pipe 4, the guide member 8 can rotate and change its orientation in accordance with the deformation of the bending portion 50 of the motor cable 5, thereby stabilizing the motion of the motor cable 5. That is, in a case where the guide member 8 is not provided, the motion of the motor cable 5 caused by the rotation of the support member 3 and the guide pipe 4 is not particularly restricted and is not stabilized (i.e., unstable). However, by providing the guide member 8, the motion of the motor cable 5 is restricted by the guide member 8. In addition, since the guide member 8 freely rotates in a plane parallel to the rotation direction of the support member 3 and the guide pipe 4, the motion of the motor cable 5 is restricted within such a limited range that the motor cable 5 becomes twisted to a moderate degree and the bending portion 50 is deformed to a moderate degree. In this manner, the motion of the motor cable 5 can be stabilized. By thus stabilizing the motion of the motor cable 5, the motor cable 5 can be prevented from being unintendedly rubbed against the inside of the base 2, and thereby the life of the motor cable 5 can be extended. Moreover, in a case where the motor cable 5 is formed as a bundle of multiple cables, the cables can be prevented from becoming unbundled. It should be noted that, in the state shown in FIG. 6B, in a vertical plane including the rotation direction of the guide pipe 4, an angle $\alpha 1$ formed by the partition wall 40 and the motor cable 5 entering the inside of the guide pipe 4 through the notch 43 was 45° when measured by the applicant.

Figure 6C:
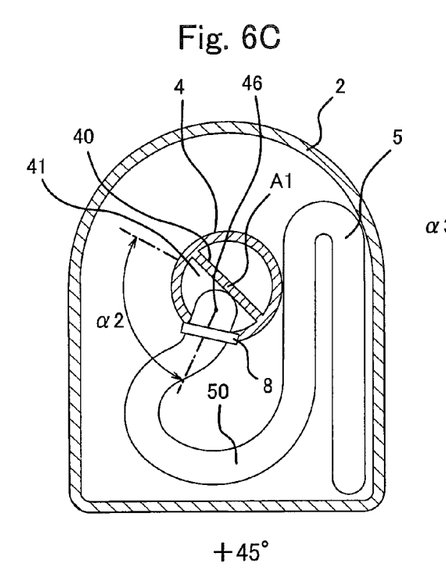

FIG. 6C shows a state where the guide pipe 4 has rotated by −75° from the state shown in FIG. 6B, i.e., a state where the guide pipe 4 has rotated by +45° from the reference state shown in FIG. 6A. As shown in FIG. 6C, the shape of the bending portion 50 of the motor cable 5 has only slightly changed. In this state, in the vertical plane including the rotation direction of the guide pipe 4, an angle $\alpha 2$ formed by the partition wall 40 and the motor cable 5 entering the inside of the guide pipe 4 through the notch 43 was 110° when measured by the applicant.

That is, it has been found from an experiment by the applicant that if the guide pipe 4 rotates by −75° from the state shown in FIG. 6B, then a difference between the angle $\alpha 2$ and the angle $\alpha 1$, i.e., 65°, is absorbed by the twisting of the motor cable 5 in the guide pipe 4, and the remaining 10° is absorbed by the deformation of the bending portion 50.

Figure 6D:
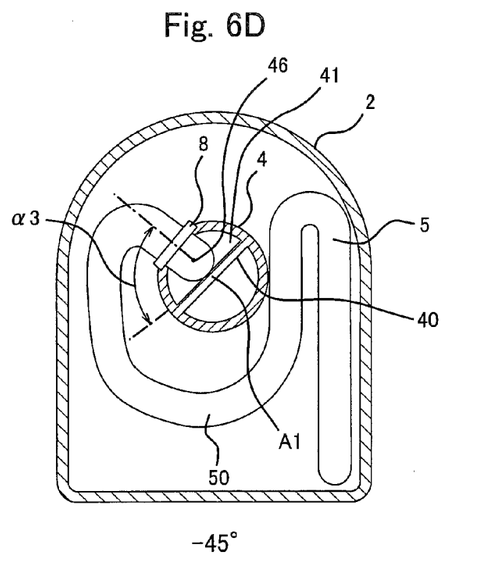

FIG. 6D shows a state where the guide pipe 4 has further rotated by −90° from the state shown in FIG. 6C, i.e., a state where the guide pipe 4 has rotated by −45° from the reference state shown in FIG. 6A. In this state, in the vertical plane including the rotation direction of the guide pipe 4, an angle $\alpha 3$ formed by the partition wall 40 and the motor cable 5 entering the inside of the guide pipe 4 through the notch 43 was 85° when measured by the applicant.

That is, it has been found from an experiment by the applicant that if the guide pipe 4 rotates by −90° from the state shown in FIG. 6C, then a difference between the angle $\alpha 3$ and the angle $\alpha 2$, i.e., 25°, is absorbed by the twisting of the motor cable 5 in the guide pipe 4, and the remaining 65° is absorbed by the deformation of the bending portion 50.

As described above, the motor cable 5 in the guide pipe 4 is twisted and the bending portion 50 of the motor cable 5 around the guide pipe 4 is deformed in accordance with the rotation of the guide pipe 4. As a result, twisting and stretching of the motor cable 5 due to the rotation of the support member 3 are absorbed. If the motor cable 5 in the guide pipe 4 is not twisted, then the entire stretching and twisting of the motor cable 5 need to be absorbed by the bending portion 50 around the guide pipe 4. In this case, the amount of bending of the bending portion 50 becomes great. In comparison, in the case where the motor cable 5 in the guide pipe 4 is twisted and the bending portion 50 of the motor cable 5 around the guide pipe 4 is deformed, the amount of bending of the bending portion 50 of the motor cable 5 can be reduced.

(Advantageous Effects Provided by Multi-Axis Robot of Present Embodiment)

The multi-axis robot 1 according to the present embodiment further provides advantageous effects as described below.

1. The motor cable 5 used for the energization of the servomotors extends in a plane parallel to the rotation direction of the guide pipe 4 in such a manner as to form the bending portion 50 around the outer peripheral surface of the guide pipe 4, and then passes through the notch 43 of the guide pipe 4. That is, the motor cable 5 is bent in a plane substantially perpendicular to the insertion direction of the motor cable 5 into the guide pipe 4. In this manner, the length of the bending portion 50 in the insertion direction of the cable into the guide pipe 4 can be made short.

Since the bending portion 50 reaches the notch 43, the bending portion 50 is provided between both ends of the guide pipe. Accordingly, the length of the base 2 in the insertion direction of the cable into the guide pipe 4 can also be made short, and as a result, the painting booth 75 in which the multi-axis robot 1 is disposed can be made compact.

Generally speaking, the larger the painting booth 75, the more the maintenance cost of the painting booth 75. Therefore, by adopting the multi-axis robot 1 according to the present embodiment, the maintenance cost of the painting booth 75 can be reduced.

2. Since the motor cable 5 and the tube 6 arranged parallel to each other can be passed through the inside of the guide pipe 4, the motor cable 5 and the tube 6 are prevented from being separated from each other and moving independently of each other, and can be stored in a compact manner. Since the tube 6 is passed through the guide pipe 4, unintended motion of the tube 6 is restricted. This makes it possible to prevent the coating quality of the workpiece from being negatively affected by unintended motion of the tube 6.

(Manner of Disposing Painting Device)

As mentioned above, the workpiece painted by the painting gun 14 is, for example, an automobile door. The inside of the door (hereinafter, "inner plate") and the outside of the door (hereinafter, "outer plate") are painted selectively in a state where the door is attached to an automobile body. The reason for selectively disposing the painting device 18 either on the base 2 or on the second link 11 is described below.

In the case of painting the inner plate, since the space between the opened door and the automobile body is narrow, if the painting device 18 is disposed on the second link 11 near the painting gun 14, then there is a risk that the painting device 18 comes into contact with and damages the door or the automobile body. Therefore, in the case of painting the inner plate alone or both of the inner plate and the outer plate, the painting device 18 is provided on the base 2, and thus the painting device 18 is disposed away from the door.

On the other hand, in the case of painting the outer plate, since the space for disposing the painting gun 14 is wide enough, there is not a risk of the painting device 18 coming into contact with the door or the automobile body even if the painting device 18 is provided on the second link 11 near the painting gun 14. Moreover, after the painting work ends, it is necessary to discard the paint remaining in the narrow tubes of the tube 6. By disposing the painting device 18 on the second link 11, the amount of paint to be discarded can be reduced since the distance from the painting device 18 to the painting gun 14 is shorter in this case. Accordingly, also from the standpoint of cost reduction, the painting device 18 is disposed on the second link 11 in the case of painting the outer plate.

In the above-described embodiment, the base 2 is mounted on the turn table 70. However, instead of the turn table 70, the base 2 may be fixedly set on a shelf (not shown) that extends from the wall 7 substantially perpendicularly to the wall 7. In this case, since the base 2 does not rotate, the motor cable 5 is not required to pass through the shelf, and the motor cable 5 from the wall 7 may be directly connected to the base 2.

Figure 7:
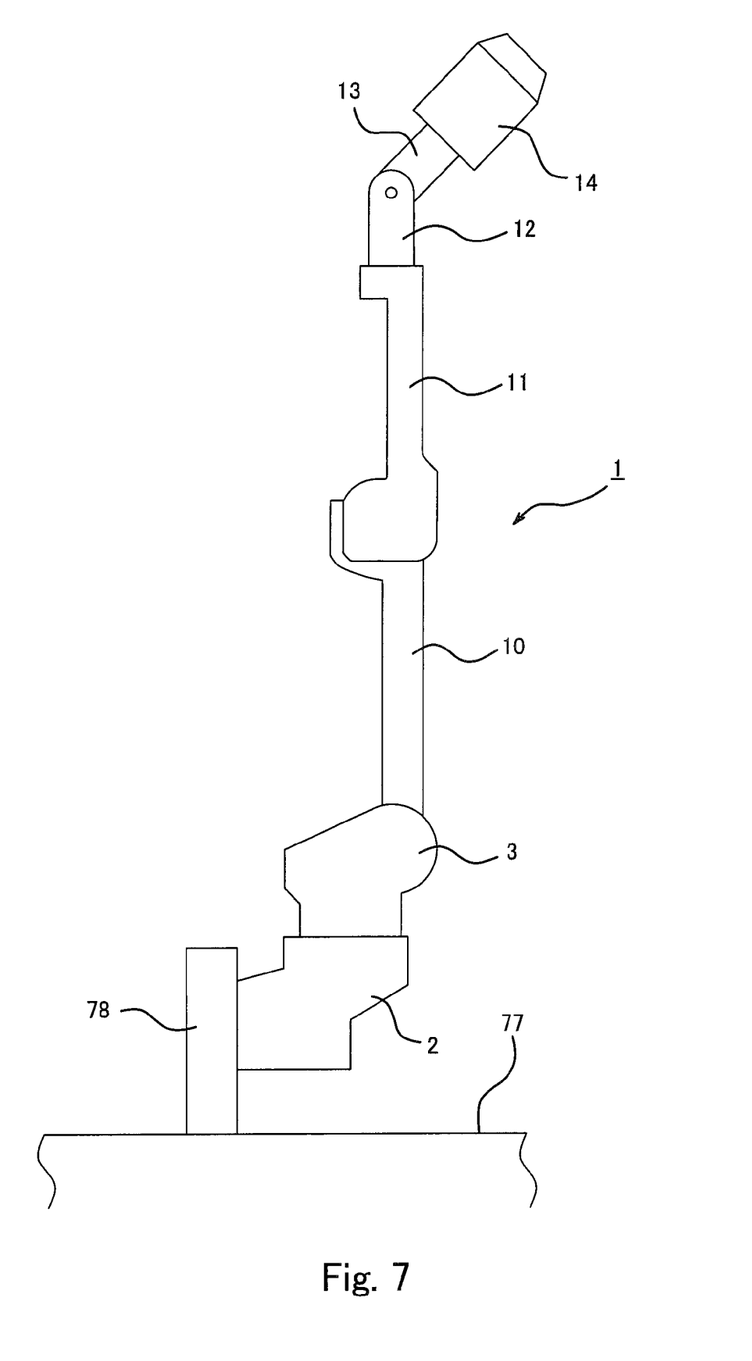
FIG. 7 is a side view showing a manner of attaching a bracket to the multi-axis robot of FIG. 1.

Further, as shown in FIG. 7, a wall-like bracket 78 may be provided on a floor surface 77. The base 2 may be provided on a side surface of the bracket 78, and thereby the multi-axis robot 1 may be provided vertically.

Figure 8:
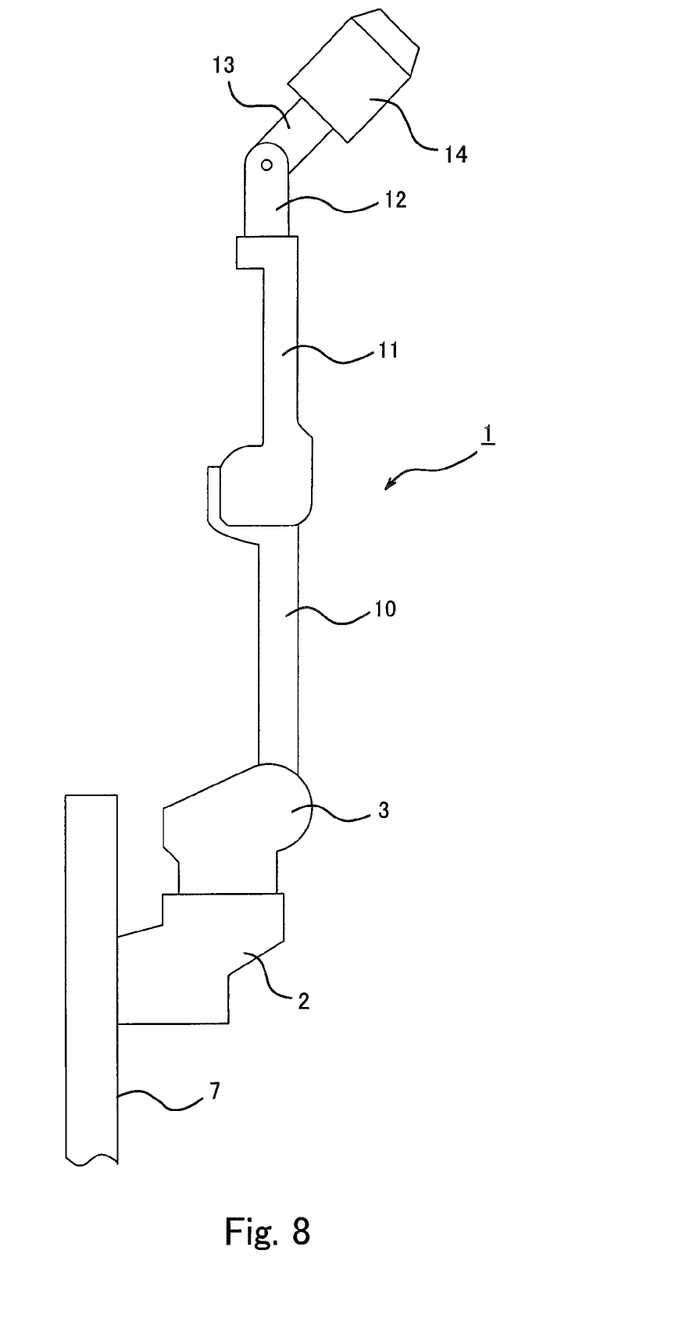
FIG. 8 is a side view showing a manner of attaching the multi-axis robot of FIG. 1 to a wall.

Still further, as shown in FIG. 8, instead of attaching the base 2 to the wall 7 via the turn table 70 or the shelf, the base 2 may be directly attached to the wall 7. In these manners, the multi-axis robot 1 according to the present embodiment can be used with various installation orientations.

Figure 9:
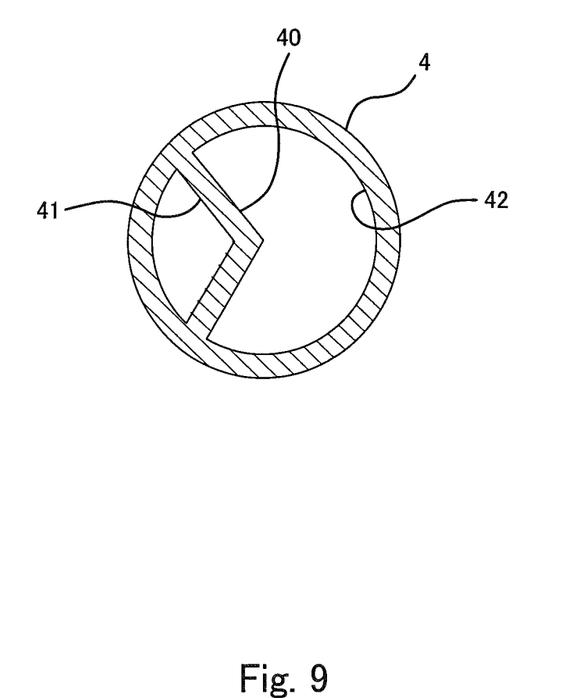
FIG. 9 is a sectional view showing another example of the configuration of the guide pipe.

In the example of FIG. 4, the partition wall of the guide pipe 4 is formed such that the partition wall has a straight shape when seen in a cross sectional view of the guide pipe 4. However, in some cases, the number of narrow tubes in the tube 6 reaches a few dozen based on the color to be used in the painting work, and the tube 6 may have a greater diameter than that of the motor cable. Accordingly, as shown in FIG. 9, the partition wall 40 may be formed such that the partition wall 40 has a V shape when seen in a cross sectional view of the guide pipe 4, and thereby the cross-sectional area of the second passage 42, through which the tube 6 is passed, may be made greater than the cross-sectional area of the first passage 41. Alternatively, while the partition wall of the guide pipe 4 is formed to have a straight shape in the cross-sectional view, the cross-sectional area of the second passage 42 may be made greater than the cross-sectional area of the first passage 41.

In the above-described embodiment, the support bar 45 is rotatably attached to the protrusion 44. However, as an alternative, the support bar 45 may be rotatably attached to the back plate 47.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

The multi-axis robot according to the present invention is useful as, for example, a robot including a linear body.

REFERENCE SIGNS LIST 1 multi-axis robot
2 base
3 support member
4 guide pipe
5 motor cable
6 tube
8 guide member
41 first passage
42 second passage
43 notch
50 bending portion

The invention claimed is:

1. A multi-axis robot comprising:
a base with a hollow;
a support member with a hollow, the support member constituting a proximal end portion of an arm of the multi-axis robot, the support member being rotatable relative to the base around a central axis of the base;
a guide pipe positioned in the support member and being rotatable together with the support member, the guide pipe having a length and including
a first end positioned in the base and being rotatable relative to the base; and
an inner space in communication with an inner space of the support member and an inner space of the base; and
a first linear body inserted in the guide pipe in a longitudinal direction of the guide pipe, wherein
a rotational center of the guide pipe deviates from a center of the first linear body,
a notch, through which the first linear body is passed, is formed in a peripheral surface of an end portion of the guide pipe, the end portion being positioned in the base,
the first linear body extends (i) from radially outside of the guide pipe to the notch, such that a bending portion is formed around an outer peripheral surface of the guide pipe in a plane parallel to a rotation direction of the guide pipe, and (ii) from the notch to the inner space of the support member by passing inside the guide pipe from the notch,
the guide pipe is divided by a partition wall into a first passage and a second passage, the first passage and the second passage extending in an axial direction of the guide pipe,
the first linear body is inserted in the first passage,
a second linear body extends to an outside of the support member by passing through the second passage, and
the first linear body and the second linear body are prevented from coming into contact with each other by the partition wall along the length of the guide pipe.

2. The multi-axis robot according to claim 1, further comprising:
a guide member positioned at the notch of the guide pipe, the guide member having a guide hole in which the first linear body is inserted in a direction perpendicular to the central axis, the guide member being rotatable relative to the guide pipe, wherein the first linear body is guided from radially outside of the guide pipe into the guide pipe through the guide hole and the notch.

3. The multi-axis robot according to claim 2, wherein
a first end of the first passage is closed, the first end of the first passage being in communication with the inner space of the base via the notch, and a second end of the first passage being in communication with the inner space of the support member,
a first end of the second passage is in communication with an external space via an opening of the support member, and a second end of the second passage is in communication with the external space via an opening of the base,
the first linear body is a linear body for energization, and is inserted in the first passage, and
the second linear body extends from the opening of the base to an outside of the support member by passing through the second passage.

4. The multi-axis robot according to claim 3, wherein the inner space of the base, the inner space of a first passage of the guide pipe, and the inner space of the support member form a sealed air-tight chamber.

5. The multi-axis robot according to claim 2, wherein the inner space of the base, the inner space of a first passage of the guide pipe, and the inner space of the support member form a sealed air-tight chamber.

6. The multi-axis robot according to claim 1, wherein
a first end of the first passage is closed, the first end of the first passage being in communication with the inner space of the base via the notch, and a second end of the first passage being in communication with the inner space of the support member,
a first end of the second passage is in communication with an external space via an opening of the support member, and a second end of the second passage is in communication with the external space via an opening of the base,
the first linear body is a linear body for energization, and is inserted in the first passage, and
the second linear body extends from the opening of the base to an outside of the support member by passing through the second passage.

7. The multi-axis robot according to claim 6, wherein the inner space of the base, the inner space of a first passage of the guide pipe, and the inner space of the support member form a sealed air-tight chamber.

8. The multi-axis robot according to claim 1, wherein the inner space of the base, the inner space of a first passage of the guide pipe, and the inner space of the support member form a sealed air-tight chamber.

* * * * *